(12) United States Patent
Behrendt

(10) Patent No.: US 12,496,091 B2
(45) Date of Patent: Dec. 16, 2025

(54) SURGICAL SHAVER

(71) Applicant: Sven Behrendt, Dortmund (DE)

(72) Inventor: Sven Behrendt, Dortmund (DE)

( * ) Notice: Subject to any disclaimer, the term of this patent is extended or adjusted under 35 U.S.C. 154(b) by 345 days.

(21) Appl. No.: 18/018,344

(22) PCT Filed: Aug. 19, 2021

(86) PCT No.: PCT/EP2021/073065
§ 371 (c)(1),
(2) Date: Jan. 27, 2023

(87) PCT Pub. No.: WO2022/043189
PCT Pub. Date: Mar. 3, 2022

(65) Prior Publication Data
US 2023/0293201 A1   Sep. 21, 2023

(30) Foreign Application Priority Data
Aug. 31, 2020   (DE) .................... 10 2020 122 718 .3

(51) Int. Cl.
*A61B 17/3207*   (2006.01)

(52) U.S. Cl.
CPC ................. *A61B 17/320783* (2013.01); *A61B 17/320758* (2013.01)

(58) Field of Classification Search
CPC .... A61B 17/320783; A61B 17/320758; A61B 17/32002; A61B 17/3201;
(Continued)

(56) References Cited

U.S. PATENT DOCUMENTS 3,937,222 A  *  2/1976  Banko ................. A61F 9/00763
                                                           606/107
4,274,414 A  *  6/1981  Johnson ........... A61B 17/32002
                                                           606/170
(Continued)

FOREIGN PATENT DOCUMENTS

| | | | |
|---|---|---|---|
| DE | 10 2019 105 514 A1 | 9/2019 | |
| EP | 2 907 460 B1 | 9/2019 | |
| JP | 2002538876 A | * 11/2002 | ..... A61B 17/320758 |

OTHER PUBLICATIONS

International Search Report in PCT/EP2021/073065, mailed Nov. 29, 2021.

*Primary Examiner* — Tan-Uyen T Ho
*Assistant Examiner* — Osama Nemer
(74) *Attorney, Agent, or Firm* — Collard & Roe, P.C.

(57) ABSTRACT

A surgical shaver has a tubular inner sleeve rotatable about its longitudinal axis and connectable to a rotary drive and a tubular outer sleeve surrounding and rotatably fixed with respect to the inner sleeve. The free distal ends of the inner and outer sleeves are open in the longitudinal direction. The outer sleeve has, near its free end, at least one cutting bar extending and projecting longitudinally and having at least one first cutting edge having a component in the longitudinal direction and starting from the foot region of the cutting bar and having at least one further cutting edge in the free end region having a component directed circumferentially inwards. The inner sleeve has, near its free end, at least one first mating bar extending and projecting longitudinally and extending substantially up to the free end of the at least one cutting bar.

10 Claims, 6 Drawing Sheets

(58) Field of Classification Search
CPC ........ A61B 17/32053; A61B 17/32056; A61B 2017/00367; A61B 2017/320028; A61B 17/320068; A61M 1/842
See application file for complete search history.

(56) References Cited

U.S. PATENT DOCUMENTS

| | | | | |
|---|---|---|---|---|
| 4,598,710 | A * | 7/1986 | Kleinberg | A61B 17/32002 600/564 |
| 4,664,112 | A * | 5/1987 | Kensey | A61B 17/320758 606/127 |
| 4,811,734 | A * | 3/1989 | McGurk-Burleson | A61F 9/00763 30/240 |
| 4,834,729 | A * | 5/1989 | Sjostrom | A61B 17/32002 604/22 |
| 5,007,917 | A * | 4/1991 | Evans | A61B 17/32002 606/167 |
| 5,741,287 | A * | 4/1998 | Alden | A61B 17/32002 606/167 |
| 6,419,684 | B1 * | 7/2002 | Heisler | A61B 17/32002 606/180 |
| 8,097,012 | B2 * | 1/2012 | Kagarise | A61B 17/50 606/171 |
| 8,574,253 | B2 * | 11/2013 | Gruber | A61M 1/842 606/171 |
| 10,271,871 | B2 * | 4/2019 | Palushi | A61B 17/320783 |
| 10,813,659 | B2 * | 10/2020 | Herrin | A61B 17/320758 |
| 2004/0181249 | A1 * | 9/2004 | Torrance | A61B 5/418 606/167 |
| 2008/0249553 | A1 | 10/2008 | Gruber et al. | |
| 2013/0103062 | A1 * | 4/2013 | To | A61B 17/320708 606/159 |
| 2019/0290312 | A1 * | 9/2019 | Herrin | A61B 17/320758 |
| 2019/0374246 | A1 * | 12/2019 | Malkevich | A61B 17/32002 |
| 2020/0170659 | A1 * | 6/2020 | Akbarian | A61B 17/32002 |

* cited by examiner

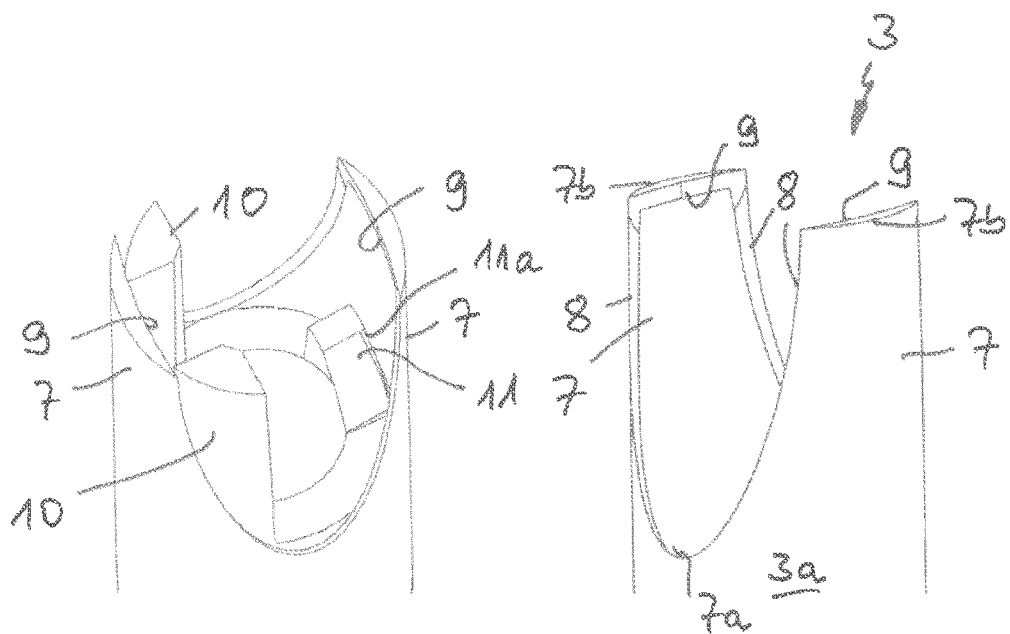
Fig. 4
Fig. 5
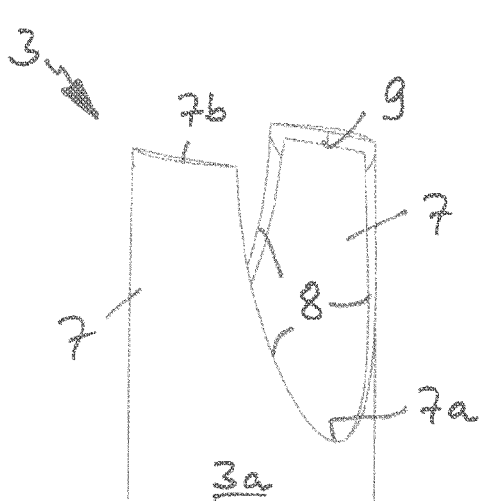
Fig. 6
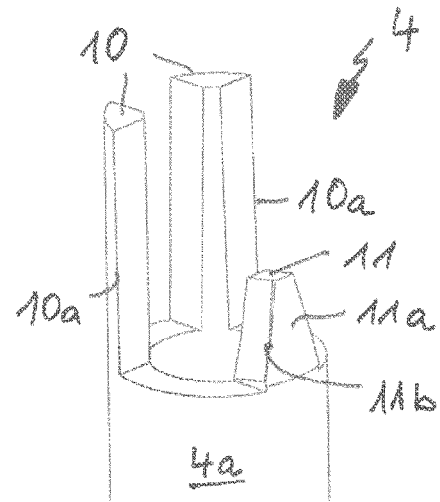
Fig. 7

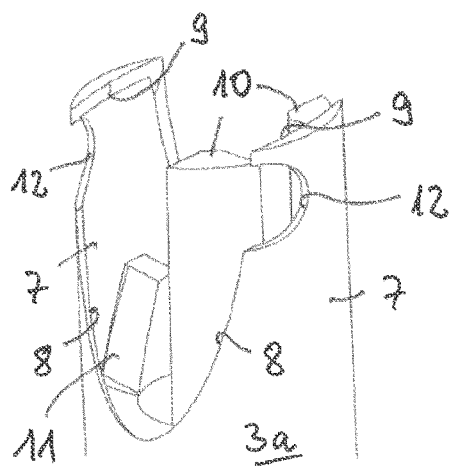
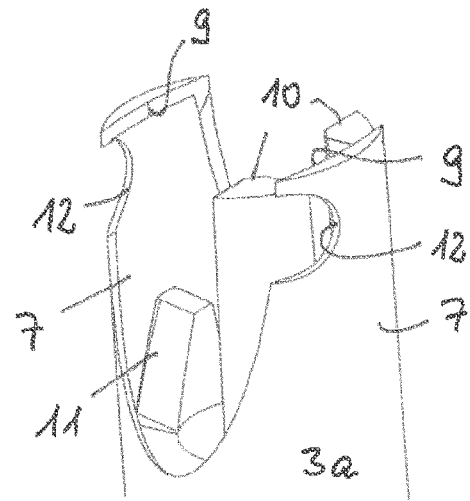
Fig. 14      Fig. 15
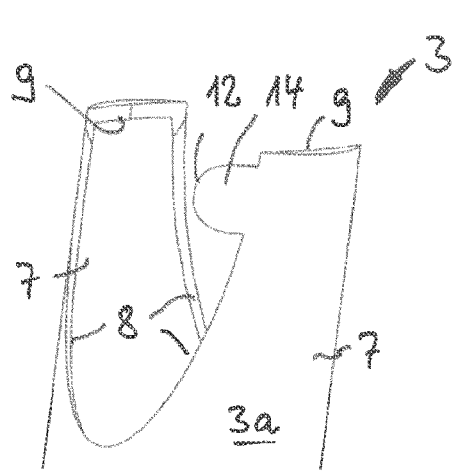
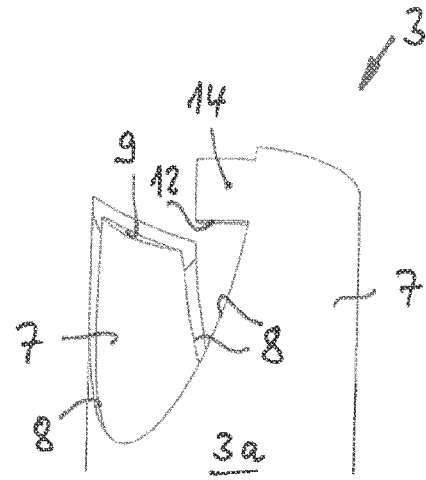
Fig. 16      Fig. 17

SURGICAL SHAVER

CROSS REFERENCE TO RELATED APPLICATIONS

This application is the National Stage of PCT/EP2021/073065 filed on Aug. 19, 2021, which claims priority under 35 U.S.C. § 119 of German Application No. 10 2020 122 718.3 filed on Aug. 31, 2020, the disclosure of which is incorporated by reference. The international application under PCT article 21(2) was not published in English.

BACKGROUND OF THE INVENTION

1. Field of the Invention

The invention relates to a surgical shaver having a tubular inner sleeve that can be rotated about its longitudinal axis and can be connected to a rotary drive, and having a tubular outer sleeve that surrounds the inner sleeve and is rotationally fixed in place with respect to it.

2. Description of the Related Art

Arthroscopic and endoscopic procedures are frequently carried out for diagnosis and treatment of joint problems. Thus, for example, ligament reconstructions, bone replenishments, and replacement of a worn meniscus can be carried out using arthroscopic reconstruction methods, in which the surgeon generally has to work through a series of relatively small openings. In the case of such methods, it can be necessary to remove meniscus tissue, for example, or other soft tissue that is situated in the joint space.

Surgical shavers are motor-driven instruments that are suitable for different ones of the aforementioned areas of application, for example for (partial) resection of meniscus tissue. Such surgical shavers have a tubular inner sleeve that can be rotated about its longitudinal axis and can be connected to a rotary drive, and a tubular outer sleeve that surrounds the inner sleeve and is rotationally fixed in place relative to it. The inner sleeve is driven by a rotary drive, in general in an oscillating manner, at high speeds of rotation (up to several 1000 revolutions per minute). By means of this (relative) rotational movement between the inner and the outer sleeve, a cutting effect is achieved when the shaver is guided along the inner and outer sleeve, with its cutting edges, up to the edge of the tissue to be removed.

From U.S. Pat. No. 5,741,287 A, a surgical shaver is known that has an outer sleeve and an inner sleeve, which is held within the rotationally fixed outer sleeve so as to rotate about its longitudinal axis, wherein the inner sleeve can be connected with a drive motor. The inner sleeve and the outer sleeve have distal free end regions that narrow conically, wherein an oval window having cutting edges is formed adjacent to the end regions, both in the outer sleeve and in the inner sleeve, in each instance. A further development of such a surgical shaver, having a special geometrical design of the window openings, is known from EP 2 907 460 B1.

However, these known shavers could still be improved, because due to the design of these shavers, based on their construction height and the placement of the cutting edges, they cannot sufficiently reach the tissue that is to be removed, so as to cut it, for example in narrow joint gaps. In some cases, neither a shaver nor any other instrument can be used. Therefore a relatively long operation duration frequently occurs.

SUMMARY OF THE INVENTION

It is the task of the invention to significantly improve a surgical shaver with regard to its use capability and cutting effect, so as to achieve a clearly shorter operation duration.

This task is accomplished, in the case of a surgical shaver of the type stated initially, according to the invention, in that the free distal ends of the inner sleeve and of the outer sleeve are open in the longitudinal direction, and that the outer sleeve, in the region of its free end, has at least one cutting bar that extends in the longitudinal direction and projects in the longitudinal direction, having at least one first cutting edge that has a component in the longitudinal direction and proceeds from the foot region of the cutting bar, and having at least one further cutting edge in the free end region, which has a component directed inward in the circumference direction, wherein the inner sleeve, in the region of its free end, has at least one first mating bar that extends in the longitudinal direction and projects outward in the longitudinal direction, which bar extends essentially all the way to the free end of the at least one cutting bar.

Using such a surgical shaver, it is possible to achieve significantly better cutting results during tissue removal as compared with the known shavers, so that the operation duration can be significantly reduced. The shaver is moved up to the edge of the tissue to be removed with its open distal end and surrounds the tissue edge, i.e. in this situation the tissue edge is situated between the at least one cutting bar and the at least one mating bar. When the inner sleeve is subsequently put into rotational motion, the shaver cuts not only in the longitudinal direction with its first cutting edge, as conventional shavers do, but rather additionally also in the circumferential direction with its further cutting edge, which is directed inward, so that tissue can be removed in a significantly shorter time. Furthermore the shaver can also remove tissue in narrow joint gaps, without further measures, since it can be introduced frontally into the joint gap with its distal free end region.

In a preferred embodiment, it is provided that the inner sleeve has at least one second mating bar that extends in the longitudinal direction and projects in the longitudinal direction, which bar does not extend all the way to the free end of the at least one cutting bar. In this regard, the outer surface of this second mating bar is preferably configured so as to slightly narrow conically toward its free end. Particularly preferably, the inner sleeve has two first and one second mating bar.

According to a first preferred embodiment, it is provided that a second cutting edge is provided on the edge region, on the end face side, of the at least one cutting bar, which edge has a component in the circumference direction, which component is directed inward. In this embodiment, this second cutting edge is then the further cutting edge. In the case of an outer sleeve having a second cutting edge, the first mating bar of the inner sleeve is configured to be only so long that a sufficiently large ring-shaped gap for cutting the tissue in the circumference direction remains between the second cutting edge and the free distal end of the first mating bar.

Alternatively or in addition, a third cutting edge can be provided adjacent to the first cutting edge, in the free end region of the at least one cutting bar, which edge has a component that is directed inward in the circumference direction. The third cutting edge is then the further cutting edge, or two further cutting edges are provided, namely the second and the third.

Furthermore, it is advantageous if it is provided that the at least one cutting bar of the outer sleeve has a first cutting edge, in each instance, on both sides. The cutting bar is then effective in both directions of rotation.

Correspondingly, it is preferably provided that the at least one cutting bar of the outer sleeve has a third cutting edge, in each instance, on both sides.

In a further embodiment, it is provided that the third cutting edge is configured in an indentation or convexity of the cutting bar. If the cutting bar has a third cutting edge on both sides, both cutting edges can be configured in an indentation or convexity, or, alternatively, one third cutting edge can be configured in an indentation and the other third cutting edge can be configured in a convexity. If the outer sleeve has multiple cutting bars, their third cutting edges can also be configured in the manner described above, so as to be the same or different.

Furthermore it can advantageously be provided that the first cutting edge has at least two cutting sections that have a different inclination relative to the longitudinal axis.

A further embodiment is characterized in that the first cutting edge is configured in arc shape, at least in certain regions.

The third cutting edge can also be configured in arc shape, at least in certain regions, preferably if it is configured in an indentation or a convexity.

The edges of the mating bar(s) of the inner sleeve can also be configured as cutting edges, at least in certain regions.

BRIEF DESCRIPTION OF THE DRAWINGS

The invention will be explained in greater detail below, using the drawing as an example. The drawing shows, in a perspective representation, in each instance, in FIG. 1 a complete view of a surgical shaver,
FIG. 2 a partial view of a shaver in a first embodiment,
FIG. 3 the shaver according to FIG. 2 in a second position,
FIG. 4 the shaver according to FIG. 2 in a third position,
FIG. 5 a partial view of the outer sleeve of the shaver according to FIG. 2,
FIG. 6 the outer sleeve according to FIG. 5 from a different perspective,
FIG. 7 a partial view of the inner sleeve of the shaver according to FIG. 2,
FIG. 8 the inner sleeve according to FIG. 7 from a second perspective,
FIG. 9 the inner sleeve according to FIG. 7 from a third perspective,
FIG. 10 a partial view of an outer sleeve in a second embodiment,
FIG. 11 the outer sleeve according to FIG. 10 from a second perspective,
FIG. 12 the outer sleeve according to FIG. 10 from a third perspective,
FIG. 13 a partial view of a shaver having an outer sleeve according to FIG. 10 and having an inner sleeve according to FIG. 7,
FIG. 14 the shaver according to FIG. 13 in a second position,
FIG. 15 the shaver according to FIG. 13 in a third position,
FIG. 16 a partial view of an outer sleeve in a third embodiment,
FIG. 17 a partial view of an outer sleeve in a fourth embodiment,
FIG. 18 a partial view of an outer sleeve in a fifth embodiment,
FIG. 19 a partial view of an outer sleeve in a sixth embodiment,
FIG. 20 a partial view of an outer sleeve in a seventh embodiment,
FIG. 21 the outer sleeve according to FIG. 20 from a second perspective,
FIG. 22 a partial view of an outer sleeve in an eighth embodiment,
FIG. 23 the outer sleeve according to FIG. 22 from a second perspective,
FIG. 24 a partial view of an outer sleeve in a ninth embodiment, and
FIG. 25 a partial view of an outer sleeve in a tenth embodiment.

DETAILED DESCRIPTION OF THE PREFERRED EMBODIMENTS

Figure 1:
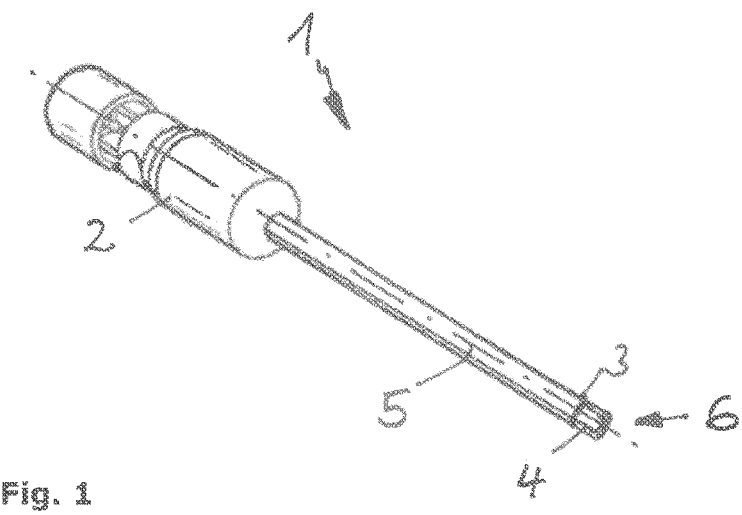

A surgical shaver according to the invention is indicated, in general, with 1 in FIG. 1. This shaver 1 has a coupling piece, indicated in general with 2, at its rear end, for coupling to a rotary drive, not shown. A tubular outer sleeve 3 is arranged on the coupling piece 2, in a torque-proof manner. A tubular inner sleeve 4 is held within this outer sleeve 3, so as to rotate, relative to the outer sleeve 3, about a longitudinal axis 5 of the shaver 1. For this purpose, the inner sleeve 4 is coupled with the rotary shaft of the rotary drive by way of the coupling piece 2 in a usual manner. The rotary drive can put the inner sleeve 4 into rotational movement at high speeds of rotation (several 1000 revolutions per minute), preferably in an oscillating manner. The ring gap between the inner sleeve 4 and outer sleeve 3 is dimensioned in such a manner that the inner sleeve 4 is guided essentially centric to the longitudinal axis 5, on the one hand, and is held within the outer sleeve 3 so as to rotate freely, on the other hand.

The configuration of the shaver 1 in its free distal end region, indicated in general with 6 in FIG. 1, i.e. the configuration of the outer sleeve 3 and the inner sleeve 4 in the free distal end region 6 are essential to the invention. This configuration is shown in different embodiments in FIGS. 2 to 25, wherein both the outer sleeve 3 and the inner sleeve 4 are shown, in each instance, only in the free end region 6 of the shaver 1. The free distal ends of the inner sleeve 4 and the outer sleeve 3 are open in the longitudinal direction, in other words in the direction of the longitudinal axis 5, in the case of all the embodiments, so that the shaver 1 can engage around the edge of a tissue, not shown, that is to be removed (for example a meniscus tissue) with its free end region 6, when the longitudinal axis 5 of the shaver 1 approximately coincides with the surface of the tissue.

A first embodiment of the outer sleeve 3 and of the inner sleeve 4 is shown in FIGS. 2 to 9, with great enlargement. The outer sleeve 3 has at least one cutting bar 7 that extends in the longitudinal direction and projects in the longitudinal direction, adjacent to its tubular region 3a in the region of its free end, wherein two cutting bars 7 are provided in the case of all the embodiments shown. Each cutting bar 7 has a first cutting edge 8 having a component in the longitudinal direction. This first cutting edge 8 proceeds from the foot region 7a of the cutting bar 7 and is configured in arc shape in the case of the first embodiment. Each cutting bar 7 furthermore has at least one further cutting edge in the free end region 6, having a component that is directed inward in the circumference direction. In the case of the first embodiment according to FIGS. 2 to 6, this further cutting edge is formed by a second cutting edge 9 on the end-face edge region 7b of the cutting bar 7. The two cutting bars 7 are configured identically in the first embodiment.

The inner sleeve 4 has at least one first mating bar 10 that extends in the longitudinal direction and projects in the longitudinal direction, adjacent to its tubular region 4a, in the region of its free end, which bar extends essentially all the way to the free end of the at least one cutting bar 7. As can best be seen in FIGS. 2 to 4, in the case of this first embodiment the first mating bar 10 is slightly shorter than the cutting bar 7, in each instance, so that a ring-shaped gap remains between the free end of the first mating bar 10 and the second cutting edge 9, for the tissue to be cut away. In this regard, the longitudinal edges 10a of the first mating bar 10 are preferably configured in such a manner that they also form cutting edges.

In the first embodiment, the inner sleeve 4 has two identically configured first mating bars 10. Furthermore, the inner sleeve 4 has at least one second mating bar 11 that extends in the longitudinal direction and projects in the longitudinal direction, which bar does not extend all the way to the free end of the at least one cutting bar 7, but rather is configured to be significantly shorter. In this regard, the second mating bar 11 is preferably configured in such a manner that its outer surface 11a narrows slightly inward conically, so that the distance between the second mating bar 11 and the cutting bars 7 increases, viewed in the longitudinal direction, toward the free end of the second mating bar 11. In this regard, the longitudinal edges 11b of the second mating bar 11 are preferably configured in such a manner that they also form cutting edges.

Figure 2:
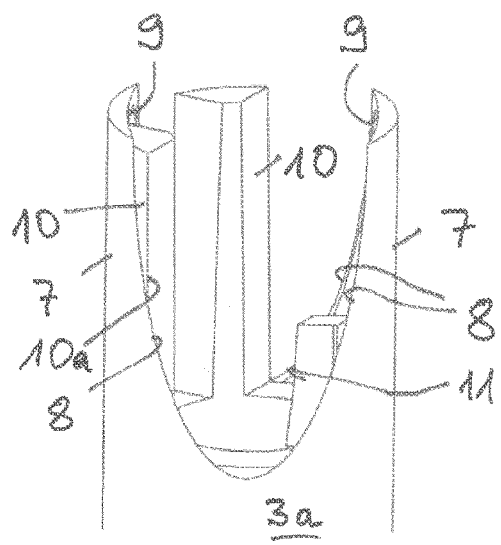
Figure 3:
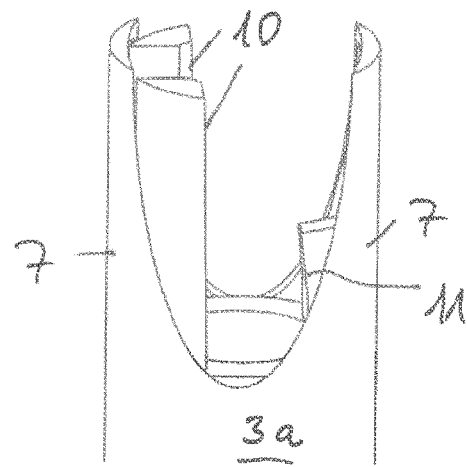
Figure 8:
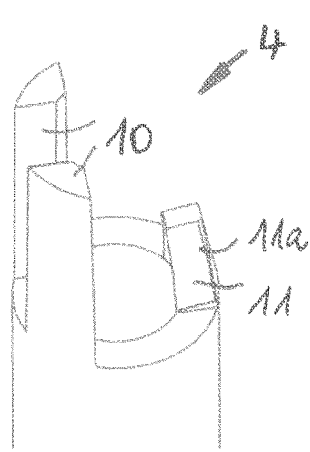
Figure 9:
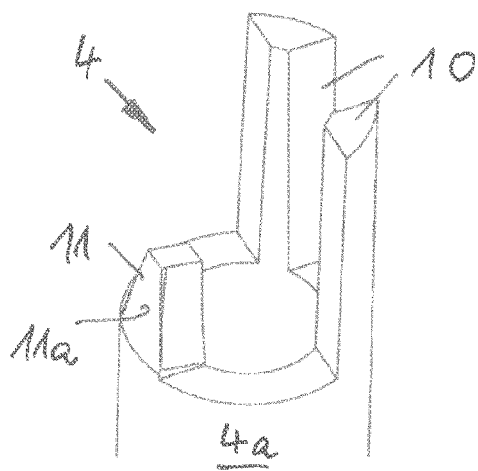

In FIGS. 2 to 4, three different rotational positions between the outer sleeve 3 and the inner sleeve 4 are shown. In the position according to FIG. 2, a first mating bar 10 is in contact (of course at a certain distance) with a cutting bar 7, so that the free distal end of the first mating bar 10 is situated in the region of the second cutting edge 9 of the cutting bar 7 and thereby tissue, not shown, is cut by the second cutting edge 9, in the circumference direction. Furthermore, a longitudinal edge 10a of the first mating bar 10 makes contact with the first cutting edge 8. As a result, the tissue, not shown, is cut through essentially in the longitudinal direction by the first cutting edge 8. FIGS. 3 and 4 show further rotational positions with correspondingly spatially changed relationships between the cutting bars 7 and the first and second mating bars 10, 11.

It can be seen that due to the configuration of the shaver 1, in other words of its free end region 6, tissue to be removed is cut through not only essentially in the longitudinal direction, as is the case for known shavers, but rather additionally also in the circumferential direction. As a result, tissue can be removed in a significantly shorter time.

Figure 10:
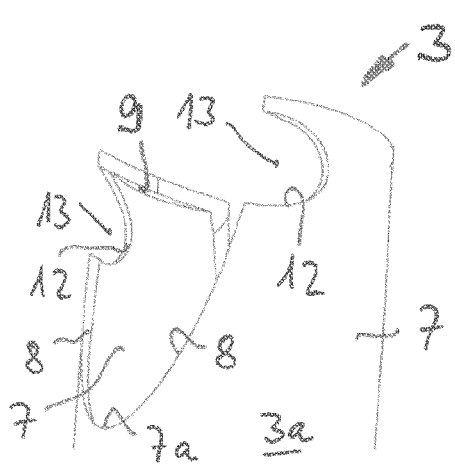
Figure 11:
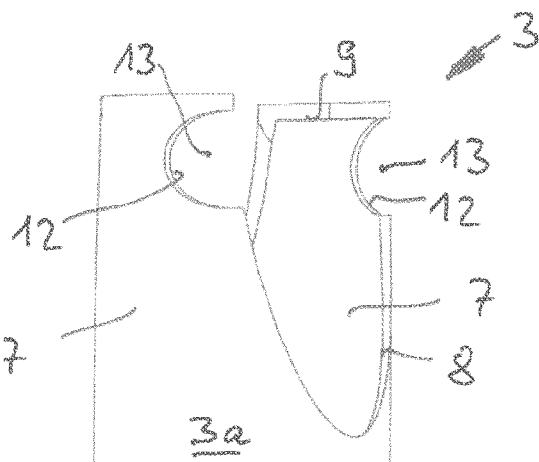
Figure 12:
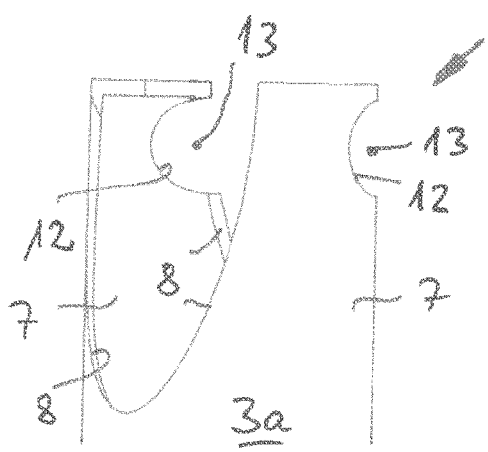

In FIGS. 10 to 12, a second embodiment of the outer sleeve 3 is shown. In contrast to the first embodiment, each cutting bar 7 has a further cutting edge on a side adjacent to the first cutting edge 8, namely a third cutting edge 12, which has a component directed inward in the circumference direction. This third cutting edge 12 is formed in an indentation 13 of the cutting bar 7 and configured in arc shape. The third cutting edge 12 makes a transition, toward the free distal end, into the second cutting edge 9. In a modification of this embodiment, the second cutting edge 9 can also be eliminated, then the third cutting edge 12 is the only further cutting edge.

In this embodiment, the indentations 13 of the two cutting bars 7 are oriented opposite one another, viewed in the circumference direction, so that depending on the rotational direction, only one of the two third cutting edges 12 is active. In a further embodiment, indentations 13 having third cutting edges 12 can also be provided on both sides of the cutting bar 7, in each instance. As shown, however, the side of the cutting bar 7 without an indentation 13 can also be configured in the same way as in the first embodiment.

Figure 13:
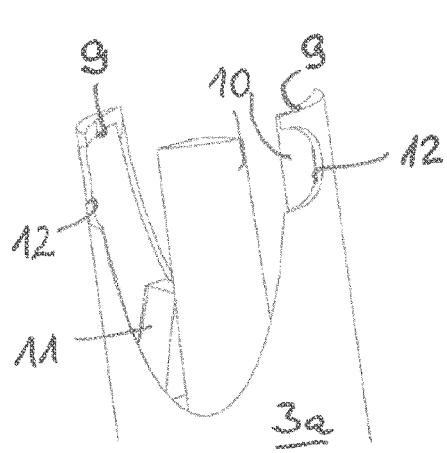

In FIGS. 13 to 15, the outer sleeve 3 according to the second embodiment is shown together with an unchanged inner sleeve 4, in three different rotational positions.

In FIG. 16, a third embodiment of the outer sleeve 3 is shown. In this embodiment, the outer sleeve 3 has a third cutting edge 12 on a cutting bar 7, which edge is configured in arc shape along a convexity 14. Fundamentally, in this third embodiment both cutting bars 7 can also have at least one convexity 14 having a second cutting edge 12, in each instance. It is also possible that an indentation 13 having a third cutting edge 12 is provided on one side of a cutting bar 7, and a convexity 14 having a third cutting edge 12 is provided on the other side. If two cutting bars 7 are present, at least one indentation 13 and/or convexity 14 can be provided on these, in a different orientation.

In FIG. 17, a fourth embodiment of the outer sleeve 3 is shown, which differs from the one according to FIG. 16 only in that the convexity 14 and the second cutting edge 12 formed on it is configured not in arc shape but rather in a rectangular manner.

Figure 18:
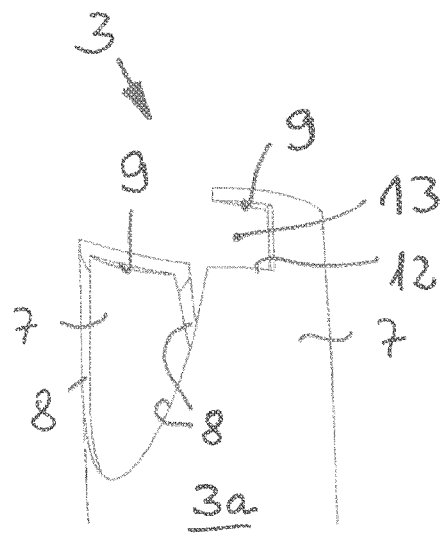

FIG. 18 shows a fifth embodiment of the outer sleeve 3. In this embodiment, an indentation 13 having a rectangular shape is provided on a cutting bar 7. In this regard, the third cutting edge 12 makes a transition into the second cutting edge 9. In this embodiment, in contrast to the second embodiment, an indentation 13 is provided only on one cutting bar 7.

Figure 19:
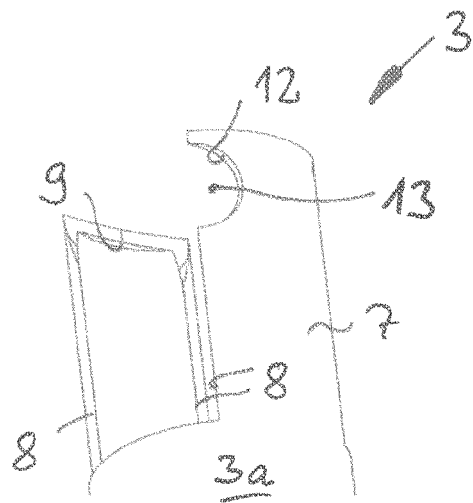

FIG. 19 shows a sixth embodiment of the outer sleeve 3. This embodiment differs from the one according to FIG. 18 only in that the indentation 13 and thereby the progression of the third cutting edge 12 is arc-shaped.

Figure 20:
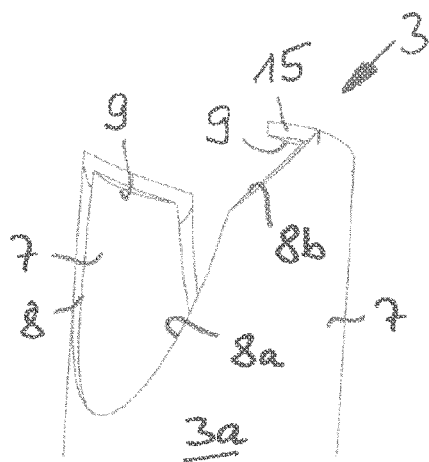
Figure 21:
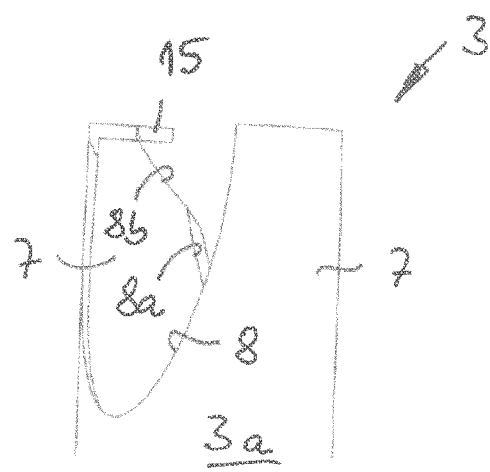

FIGS. 20 and 21 show an outer sleeve 3 in a seventh embodiment. On a cutting bar 7, the first cutting edge 8 has two cutting sections 8a and 8b, which have a different inclination relative to the longitudinal axis 5. In this regard, a first cutting section 8a is configured in arc shape, while the second cutting section 8b is configured essentially in a straight line. Furthermore, it is provided, in the case of this cutting bar 7, that the second cutting edge 9 is continued in a ring-shaped bar 15.

Figures 22, 23:
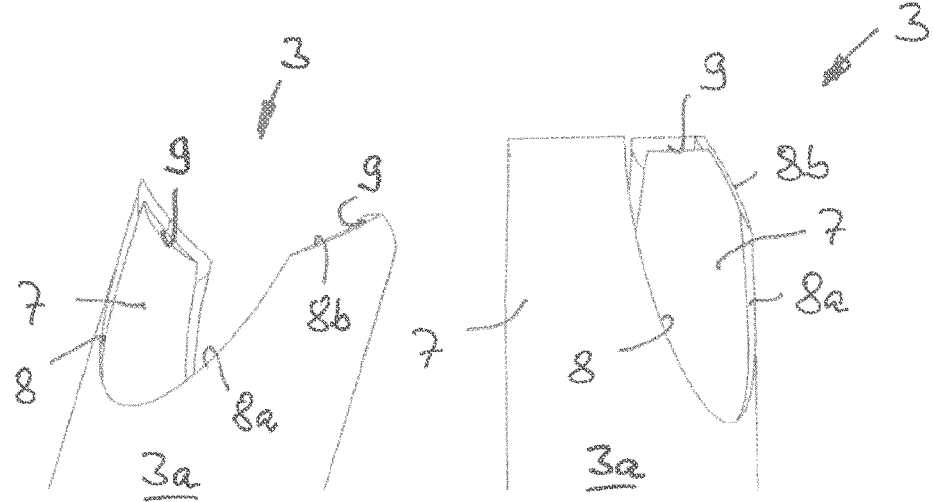

FIGS. 22 and 23 show an outer sleeve 3 in an eighth embodiment. This eighth embodiment of the outer sleeve 3 differs from the seventh embodiment only in that the bar 15 is eliminated.

Figures 24, 25:
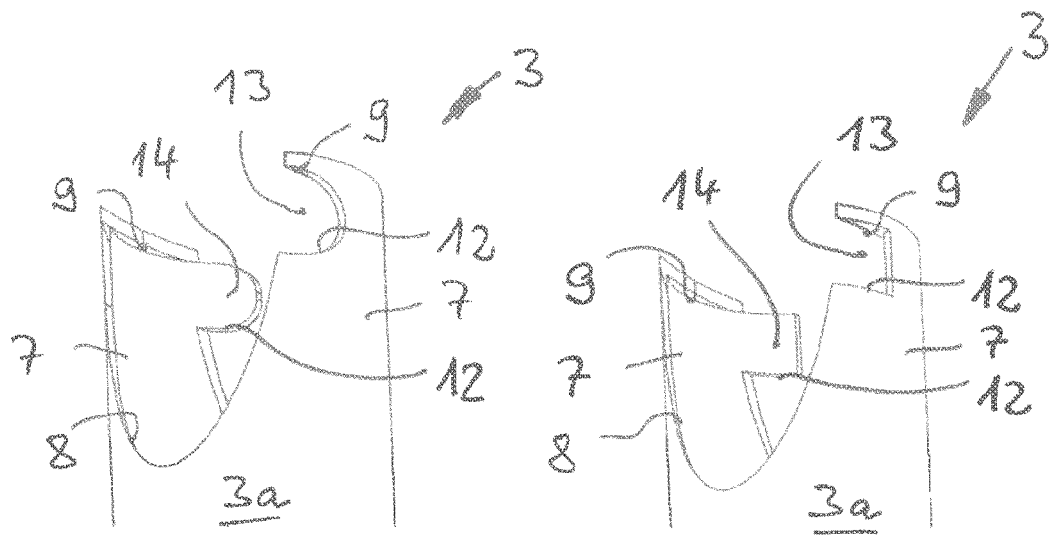

In FIG. 24, a ninth embodiment of the outer sleeve 3 is shown. In this embodiment, two cutting bars 7 are provided, wherein one cutting bar 7 has an arc-shaped indentation 13 having a third cutting edge 12, and the other cutting bar 7 has an arc-shaped convexity 14 having a third cutting edge 12. Furthermore, first and second cutting edges 8, 9 are present on both cutting bars 7.

Finally, a tenth embodiment of the outer sleeve 3 is shown in FIG. 25. This embodiment differs from the ninth embodiment only in that the indentation 13 having a third cutting edge 12 is configured on a cutting bar 7, and the convexity 14 having a third cutting edge 12 is configured on the other cutting bar 7, not in arc shape but in a rectangular manner.

Of course, the invention is not restricted to the exemplary embodiments shown. Other embodiments are possible without departing from the basic idea. For example, the different geometrical embodiments of the outer sleeve 3 can be combined with one another in any desired manner within the scope of the embodiment described above. For example, a cutting bar 7 can have an indentation 13 on one side and a convexity 14 on the other side. Fundamentally, only one cutting bar 7 can also be provided, or, alternatively, more than two. The inner sleeve 4 can also have only a first mating bar 10, with or without a second mating bar 11.

REFERENCE SYMBOL LIST 1 surgical shaver
2 coupling piece
3 outer sleeve
3a tubular region
4 inner sleeve
4a tubular region
5 longitudinal axis
6 free end region
7 cutting bar
7a foot region
7b edge region
8 first cutting edge
8a first cutting section
8b second cutting section
9 second cutting edge
10 first mating bar
10a longitudinal edge
11 second mating bar
11a outer surface
11b longitudinal edge
12 third cutting edge
13 indentation
14 convexity
15 bar

The invention claimed is:

1. A surgical shaver having a tubular inner sleeve that can be rotated about a longitudinal axis of the inner sleeve and can be connected to a rotary drive, and having a tubular outer sleeve that surrounds the inner sleeve and is rotationally fixed in place with respect to the inner sleeve, wherein the free distal ends of the inner sleeve and of the outer sleeve are open in a longitudinal direction, and wherein the outer sleeve, in the region of a free end of the outer sleeve, has at least one cutting bar that extends in the longitudinal direction and projects in the longitudinal direction, having at least one cutting edge that has a component in the longitudinal direction and proceeds from a foot region of the cutting bar, and having at least one further cutting edge in the free end region, which has a component directed inward in a circumference direction, wherein the inner sleeve, in the region of a free end of the inner sleeve, has at least one first mating bar that extends in the longitudinal direction and projects in the longitudinal direction, wherein the at least one first mating bar is shorter than the at least one cutting bar so that a ring-shaped gap remains between the free end of the at least one cutting bar and the at least one further cutting edge, and wherein the at least one cutting bar and the at least one mating bar are so configured that the shaver is movable with an open distal end of the shaver up to an edge of a tissue to be removed and surrounds the tissue edge so that the tissue edge is situated between the at least one cutting bar and the at least one mating bar.

2. The shaver according to claim 1,
wherein the inner sleeve has at least a second mating bar that extends in the longitudinal direction and projects in the longitudinal direction,
wherein the at least second mating bar does not extend all the way to the free end of the at least one cutting bar.

3. The shaver according to claim 1,
wherein a second cutting edge is provided on an end-face edge region of the at least one cutting bar,
wherein the second cutting edge has a component that is directed inward in the circumference direction.

4. The shaver according to claim 1,
wherein a third cutting edge is provided adjacent to the first cutting edge, in the free end region of the at least one cutting bar,
wherein the third cutting edge has a component that is directed inward in the circumference direction.

5. The shaver according to claim 1, wherein the at least one cutting bar of the outer sleeve has a first cutting edge on first and second sides of the at least one cutting bar.

6. The shaver according to claim 4, wherein the at least one cutting bar of the outer sleeve has the third cutting edge on first and second sides of the at least one cutting bar.

7. The shaver according to claim 4, wherein the third cutting edge is configured in an indentation or convexity of the cutting bar.

8. The shaver according to claim 1, wherein the first cutting edge has at least two cutting sections, which have a different inclination relative to the longitudinal axis.

9. The shaver according to claim 1, wherein at least one region of the first cutting edge is configured in arc shape.

10. The shaver according to claim 4, wherein at least one region of the third cutting edge is configured in arc shape.

* * * * *